United States Patent
Harding et al.

(10) Patent No.: US 10,861,101 B1
(45) Date of Patent: Dec. 8, 2020

(54) SOURCE AND MANAGE SUPPLIER SYSTEM AND METHOD

(71) Applicant: United Services Automobile Association (USAA), San Antonio, TX (US)

(72) Inventors: Nathan Samuel Harding, Austin, TX (US); Tasia Madrid Lee, San Antonio, TX (US); Erin Nichele Thiele, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 680 days.

(21) Appl. No.: 15/487,084

(22) Filed: Apr. 13, 2017

Related U.S. Application Data

(60) Provisional application No. 62/322,635, filed on Apr. 14, 2016.

(51) Int. Cl.
   *G06Q 40/00* (2012.01)
   *G06Q 40/08* (2012.01)
   *G06Q 10/06* (2012.01)

(52) U.S. Cl.
   CPC ....... *G06Q 40/08* (2013.01); *G06Q 10/06315* (2013.01)

(58) Field of Classification Search
   CPC ... G06G 40/00; G06G 40/08; G06G 10/06315
   See application file for complete search history.

(56) References Cited

U.S. PATENT DOCUMENTS

| | | | | |
|---|---|---|---|---|
| 9,811,862 | B1* | 11/2017 | Allen | G06K 9/00637 |
| 10,467,700 | B1* | 11/2019 | Loo | G06Q 40/08 |
| 2005/0021360 | A1* | 1/2005 | Miller | G06Q 10/0635 |
| | | | | 705/7.28 |
| 2009/0287565 | A1* | 11/2009 | Bishop | G06Q 20/02 |
| | | | | 705/14.38 |
| 2013/0226624 | A1* | 8/2013 | Blessman | G06Q 40/08 |
| | | | | 705/4 |
| 2016/0012542 | A1* | 1/2016 | Steben | G06Q 40/08 |
| | | | | 705/4 |

OTHER PUBLICATIONS

Seduction by Technology: Why Consumers Opt Out of Privacy by Buying into the Internet of Things * Bailey, Melissa W. Texas Law Review; Austin vol. 94, Iss. 5, (2016): 1023-1054. (Year: 2016).*

* cited by examiner

*Primary Examiner* — Lalita M Hamilton
(74) *Attorney, Agent, or Firm* — Fletcher Yoder, P.C.

(57) ABSTRACT

Systems and methods related to sourcing and managing a supplier is provided. For example, a system includes a processor operatively coupled to a memory and configured to receive an indication of one or more sourcing designations for a property and casualty insurance claim from a remote device, evaluate at least one of a respective risk and a respective cost associated with multiple suppliers that may be used to address the one or more sourcing designations, provide a recommendation to use a recommended supplier of the multiple suppliers based at least in part on the at least one of the respective risk and the respective cost of the multiple suppliers, and generate a contract that is appropriate for use with the recommended supplier of the multiple suppliers.

20 Claims, 8 Drawing Sheets

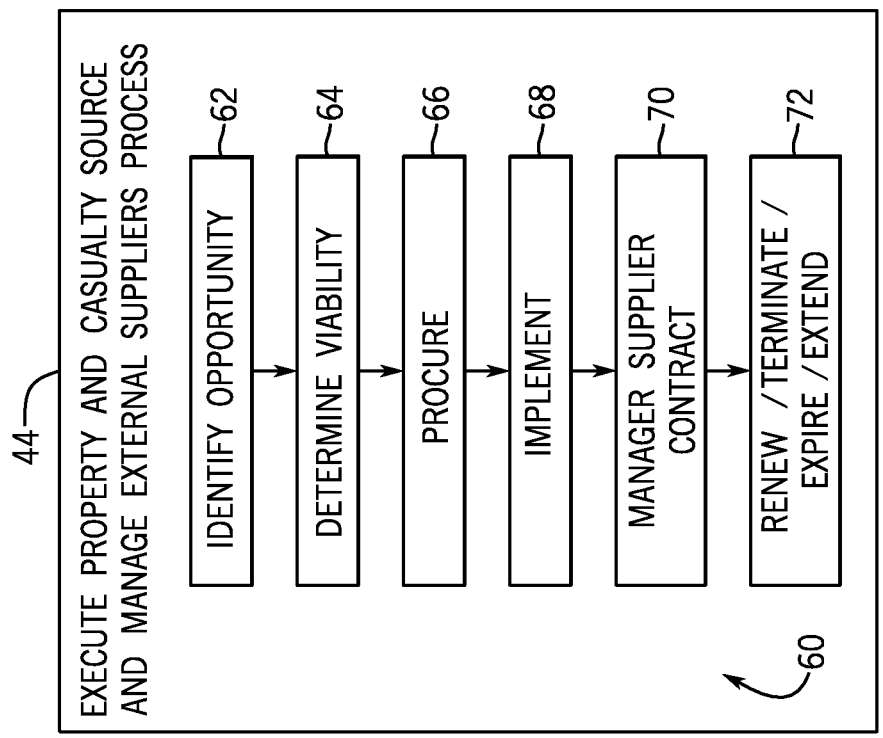

US 10,861,101 B1

SOURCE AND MANAGE SUPPLIER SYSTEM AND METHOD

CROSS-REFERENCE TO RELATED APPLICATION

This application claims priority to and the benefit of U.S. Provisional Application No. 62/322,635, entitled "SOURCE AND MANAGE SUPPLIER SYSTEM AND METHOD," filed Apr. 14, 2016, which is hereby incorporated by reference in its entirety for all purposes.

BACKGROUND

The present disclosure relates generally to systems and methods for enhancing a sourcing and managing process of a supplier portfolio.

In the insurance industry, claims, underwriting, competitive intelligence, product management, or other support functions for an insurance provider may be sourced by suppliers internal to the insurance provider or external to the insurance provider. Oftentimes, the value of the contracts that are executed may not be fully realized due to expensive oversight, various clauses in the contracts, or other factors. In some instances, focusing on an individual step in a source and manage process or reducing oversight of a specific contract may help realize value of the contract. However, it is now recognized that there is a need for enhancing the sourcing and managing process for a supplier, particularly in the property and casualty space.

DRAWINGS

These and other features, aspects, and advantages of the present disclosure will become better understood when the following detailed description is read with reference to the accompanying drawings in which like characters represent like parts throughout the drawings, wherein:

FIG. 2 is a flow chart of a method for recommending an internal or external supplier, in accordance with embodiments described herein;

FIG. 3 is a flow chart of a method for executing a property and casualty source and manage external supplier process, in accordance with embodiments described herein;

DETAILED DESCRIPTION

Figure 1:
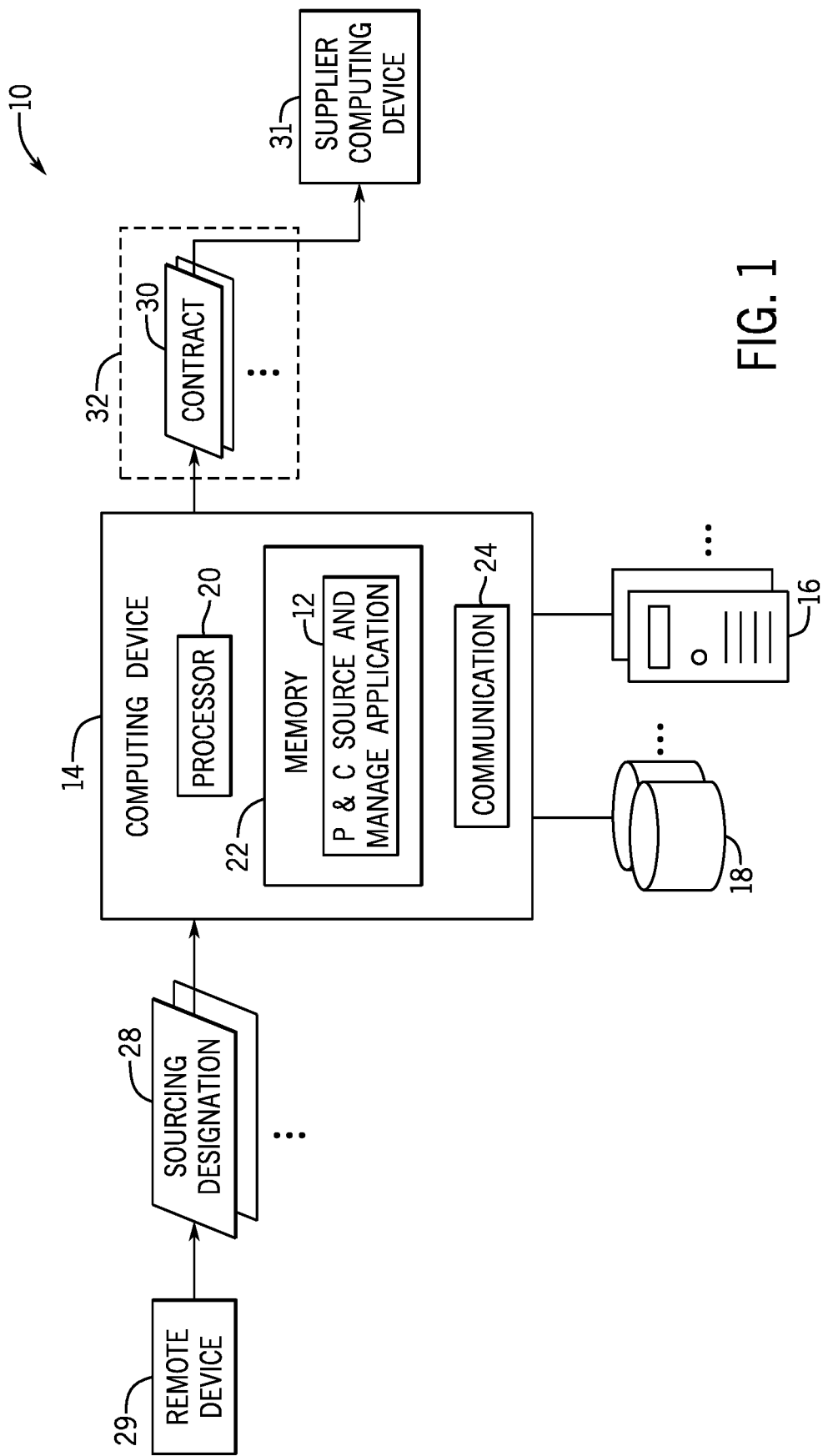
FIG. 1 is a block diagram of components of a system that uses a property and casualty source and manage application, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems, methods, and applications for enhancing a sourcing and managing process for a portfolio of property and casualty suppliers. Although the following discussion relates to property and casualty insurance, it should be appreciated that the techniques may be used with any type of insurance. The property and casualty sourcing and managing process for suppliers may refer to a process from a sourcing designation internal to an insurance provider through leveraging suppliers to fulfill property and casualty and enterprise objectives. The techniques disclosed herein attempt to ensure value is realized from contracts within a supplier portfolio of the insurance provider while not eroding the value of the contracts through expensive oversight. Some embodiments may aggregate the contracts to enable analysis at the supplier portfolio level and some embodiments may analyze the contracts at an individual level. Further, the enhanced sourcing and managing processes may include techniques applicable to internal suppliers and external suppliers. Internal suppliers may refer to suppliers that are affiliates (e.g., business partner) with the insurance provider and may provide a service that generates an expense for the consumer of that service. In contrast, external suppliers may refer to suppliers that are not affiliates.

In some embodiments, the sourcing and managing suppliers process may provide end-to-end analysis from obtaining sourcing designations to determining viability of the designations, procuring a contract related to the designations, implementing objectives in the contract, managing the supplier of the service and/or product described in the contract, and determining whether to renew, modify, or terminate the contract. Data may be obtained throughout the process to enable historical analysis to identify strengths and weaknesses of the specifics in each of the contracts in the supplier portfolio to enable better sourcing decisions to be made in the future. Accordingly, some embodiments aggregate information within a sourcing portfolio and use systems to smartly collect data for assessing additional opportunities or reassessing current sourcing. Further, the techniques may compare various factors of the internal supplier process versus the external supplier process, such as how much each process would cost, how long each process would take, how much risk each process entails, and the like. Based on the comparison, the techniques may select and/or recommend either the internal supplier or the external supplier to provide the sourcing. As such, some embodiments provide a holistic view of the supplier portfolio and allow for triggers to be used to focus efforts on opportunities and to enable realization of value in supplier relationships. Additionally, the techniques may allow oversight to be cost effective from a consumer perspective and may facilitate regulatory compliance, among other things.

With the foregoing in mind, FIG. 1 is a block diagram of components of a system 10 that uses a property and casualty source and manage application 12 (referred to as "the application 12" herein), in accordance with embodiments described herein. As depicted, the system 10 may include a computing device 14 communicatively coupled to one or more servers 16 and/or one or more databases 18. The computing device 14 may be a personal computer, a tablet, a laptop, a smartphone, a server, or the like. The computing device 14 may include a processor 20, a memory 22, and a communication component 24. The communication component 24 may be a wireless or wired communication component that may facilitate communication between the computing device 14 and the one or more servers 16 and/or the computing device 14 and the one or more databases 18.

The processor 20 may be any type of computer processor or microprocessor capable of executing computer-executable code. The processor 20 may also include multiple processors that may perform the operations described below. The memory 22 may be any suitable articles of manufacture that can serve as media to store processor-executable code, data, or the like. These articles of manufacture may represent computer-readable media (e.g., any suitable form of memory or storage) that may store the processor-executable code used by the processor 20 to perform the presently disclosed techniques. For example, as depicted, the memory 22 may store the processor-executable code that implements the application 12. It should be understood that the application 12 may be implemented as a software program, a service, a website, an application programming interface (API), or the like. Also, although the application 12 is shown as stored on the memory 22, it should be understood that the application 12 may reside in one or more memories of the servers 16 or may be distributed between the memory 22 of the computing device and one or more memories of the servers 16.

Additionally, the memory 22 may store a multitude of information related to the property and casualty source and manage internal and external processes executed by the application 12, as described in detail below. In some embodiments, the data may be used for real-time analysis, historical analysis, and/or trend identification to enable better value realization in contract drafting and decision making in the future. The memory 22 may represent tangible, non-transitory computer-readable media (e.g., any suitable form of memory or storage) that may store the processor-executable code used by the processor 20 to perform various techniques described herein. It should be noted that non-transitory merely indicates that the media is tangible and not a signal. In some embodiments, the information obtained by and/or used by the application 12 may be stored in the one or more databases 18. In some embodiments, the one or more databases 18 may be located in a memory device separate from the computing device 14 or located in the memory 22 of the computing device 14.

In some embodiments, the application 12 may receive an indication of one or more sourcing designations 28 (e.g., events, incidents, or problems). The sourcing designations 28 may relate to any problem to which insurance sourcing may be a solution. For example, a claim for roof damage made by a participating member of the insurance provider may be a sourcing designation 28. The sourcing designations 28 may be entered by a user using an input peripheral of the computing device 14, such as a keyboard, mouse, touchscreen, microphone, or the like. In some embodiments, the sourcing designations 28 may be entered and transmitted to the computing device 14 via one or more remote devices 29, which may be any suitable device that is physically separate from the computing device 14. For example, the remote device 29 may be a personal computer, a tablet, a laptop, a smartphone, a server, or the like configured to receive a user input indicative of the one or more sourcing ideas 28, such as an input from an insurance policyholder, an insurance employee or agent, an insurance adjuster, or the like. In some embodiments, the remote device 29 may be a sensor, such as a sensor configured to detect water leaks and/or pipe leaks, a sensor configured to detect the presence of water, such as standing water due to flooding, a sensor configured to detect fire, wind, and/or hail, or the like. In some such cases, the one or more sensors 29 may be positioned at a structure (e.g., a house or a building) and may generate a signal indicative of water damage to the structure, wind or hail damage to the structure, or the like. In some embodiments, the input or receipt of the one or more sourcing designations 28 at the computing device 14 may trigger or cause the application 12 to execute the source and manage process.

The application 12 may execute the source and manage process for internal suppliers and for external suppliers to determine and/or recommend whether to use the internal supplier or the external supplier to address the sourcing designation 28. The application 12 may generate one or more contracts 30 (e.g., a written agreement or document), which may be part of a portfolio 32 (e.g., a set or collection of contracts 30). The contracts 30 may represent agreements between the insurance provider and the supplier of the service. In some embodiments, the contracts 30 may include terms for type of service, term of service, payment details, warranties, parts/labor involved, and the like. Thus, the application 12 may analyze each contract 30 individually or rolled into a portfolio 32 to determine and recommend selection of the internal supplier or the external supplier based on whether the supplier is more cost effective, carries less risk, can perform the service in a shorter time period, or some combination thereof. Further, in some embodiments, the application 12 may perform its analysis by comparing historical data and trends for contracts 30 related to the suppliers or the type of service to be performed.

As discussed in more detail below, in some embodiments, the computing device 14 may output or provide one or more generated contracts 30 to a supplier computing device 31 (e.g., accessible to the selected internal or external supplier). In some embodiments, the processor 20 may instruct the communication component 24 to communicate the generated contract 30 to the supplier computing device 31 in response to generation of the contract 30 and/or communication of the generated contract 30 to the supplier computing device 31 may cause or trigger an alert (e.g., an audible or visual alert at the supplier computing device 31) that the contract 30 is available for review and/or cause or trigger an application to open on the supplier computing device 31 to enable the supplier to review, suggest or request changes, and/or amend the contract 30. The supplier computing device 31 may be a personal computer, a tablet, a laptop, a smartphone, a server, or the like, and may include a processor, a memory, and a communication component.

It should be noted that the components described above with regard to the computing devices 14, 31 are example components and the computing devices 14, 31 may include additional or fewer components as shown. Additionally, it should be noted that there may be numerous computing devices 14, 31 that are used in the system 10.

FIG. 2 is a flow chart of a method 40 for recommending an internal or external supplier, in accordance with embodiments described herein. Although the following description of the method 40 is described with reference to the application 12 (e.g., implemented as processor-executable code stored on the memory 22) executing via the processor 20 of the server computing device 14, it should be noted that the methods may be performed by the application 12 executing via other processors disposed on other devices that may be capable of communicating with the computing device 14, such as the one or more servers 16, or other components associated with the system 10. Additionally, although the following method 40 describes a number of operations that may be performed by the application 12, it should be noted that the method 40 may be performed in a variety of suitable orders and all of the operations may not be performed. It should be appreciated that the method 40 may be wholly executed by the computing device 14 or the execution may be distributed between the computing device 14 and the one or more servers 16.

Referring now to the method 40, the processor 20 may receive (block 42) one or more sourcing designations 28. As previously discussed, the sourcing designations 28 may include problems to which sourcing may be a solution. Collecting the sourcing designations 28 may enable the processor 20 to determine whether different business units of the insurance provider are encountering the same problem and be able to source for the larger need, instead of sourcing many times for the same problem. As such, efficiency of scale may be enabled using the disclosed techniques and expenses may be reduced. After the sourcing designations 28 are received, the processor 20 may execute (block 44) the property and casualty source and manage external supplier process.

In general, the property and casualty source and manage external supplier process is a process that may aggregate the sourcing designations 28 and collect information to determine the scope and viability of those sourcing designations 28. The process contains checkpoints to evaluate the viability and then facilitate the prioritization of viable sourcing designations 28. The viable sourcing designations 28 may be moved into procurement with guardrails (e.g., automatic triggers) to ensure the continued viability through negotiation and execution of a contract 30 with the external supplier. The executed contract 30 may enter implementation to ensure full knowledge transfer and enablement of the supplier. The implemented contract 30 may be managed through its lifecycle in areas including operational risk, financials, and/or performance to ensure contractual fulfillment. At the conclusion of the term of the contract 30, the process may assess the projected benefit versus the realized benefit in addition to the outputs of the management to determine if the contract 30 can be extended or if it needs to be renegotiated to provide value. Further, the processor 20 may determine at least two metrics (e.g., a cost of externally sourcing the sourcing designation 28 and a risk associated with externally sourcing the sourcing designation 28) as part of the process for external suppliers.

The processor 20 may also execute (block 46) the property and casualty source and manage internal supplier process. In some embodiments, the property and casualty source and manage internal supplier process may mirror (e.g., include the same steps tailored to internal suppliers) the process for external suppliers discussed above. However, in some embodiments, the process for internal suppliers may not include as many steps as the process for external suppliers. For example, in some instances, the process for internal suppliers may not analyze the benefits. The processor 20 may determine at least two metrics (e.g., a cost of internally sourcing the sourcing designation 28 and a risk associated with internally sourcing the sourcing designation 28) as part of the process for internal suppliers.

The processor 20 may compare (block 48) the metrics for internally sourcing against the metrics for externally sourcing the sourcing designation 28 to determine which sourcing route is more feasible. The processor 20 may recommend (block 50) whether to source using the internal supplier or the external supplier (e.g., via a visible indication on a display communicatively coupled to the computing device 14). For example, the processor 20 may determine that externally sourcing the designation 28 using external suppliers is more cost effective than internally sourcing the designation 28 and recommend using external suppliers. In another example, the processor 20 may determine that although externally sourcing is more cost effective, the risk is much higher than internally sourcing the designation 28 and the processor 20 may recommend using internal suppliers. In this way, the processor 20 may use the two metrics to objectively measure and recommend using internal or external suppliers.

In addition, in some embodiments, the processor 20 may analyze the portfolio 32 of contracts 30 as a whole to determine how risk, cost, and/or value is distributed. For example, the processor 20 may determine that a certain segment of contracts 30 carries all of the risk of the portfolio 32 and the impact to the business may be substantial if something goes awry during execution of those contracts 30. As a result, the processor 20 may select contracts 30 to be sourced that do not add risk to the risk-laden segment of the portfolio 32.

Turning now to the process for external suppliers, FIG. 3 is a flow chart of a method 60 for executing a property and casualty source and manage external supplier process, in accordance with embodiments described herein. As depicted, the method 60 may be included as part of the block 44 of the method 40 in FIG. 2. It should be noted that each of the steps of the method 60 may be identified at a high level in the following discussion and described at a detailed level in discussions regarding respective flow charts in FIGS. 4-9 below.

Referring now to the method 60 in FIG. 3, the processor 20 may identify (block 62) opportunities from the acquired sourcing designations 28. Identifying a sourcing designation 28 as an opportunity may refer to determining that the sourcing designation 28 may be profitable and/or include low risk. The processor 20 may determine (block 64) the viability of the sourcing designation 28 identified as opportunities. The processor 20 may procure (block 66) the sourcing designations 28 by generating a contract 30 for an external supplier based on data collected during the viability determination of block 64. The data may inform the elements (e.g., contractual terms) to include in the contract 30 between the insurance provider and the external supplier. The terms and elements that are included in the contract 30 may change as the parties negotiate the contract 30. The processor 20 may store the changes, which may enable analyzing whether initial assumptions of terms to include in the contract 30 transform throughout the negotiations. For example, the contract 30 may be sent from the computing device 14 to the supplier computing device 31, which may enable the supplier to suggest or make revisions to the contract 30. Over time, the transformations of the terms and elements may enable identifying trends for using certain external suppliers for certain sourcing designations 28. The trends may enable selecting terms and elements for contracts 30 (e.g., determining and/or selecting from the memory 22 or the one or more databases 18) that are more quickly agreed upon, thereby cutting down negotiating time and costs. The procurement process may generate a contract 30 that is agreed upon by the parties and the processor 20 may collect data on the expected value to be realized from the contract 30.

The processor 20 may then implement (block 68) the contract 30 by analyzing the contract 30 to ensure proper terms and measures are included for the contract 30 to be operational to realize its full value. For example, the processor 20 may check if the contract 30 includes terms for any knowledge transfer that is needed, the details of connecting any systems, and/or other terms to ensure that elements that provide value are included in the contract 30. Once implementation is complete, the processor 20 may manage (block 70) the external supplier contract 30. Managing the contract 30 may include analyzing categories including performance of the supplier, finances related to the contract 30 execution, relationship quality with the supplier, operational risk associated with the contract 30, or the like. The processor 20 may manage the contract 30 on a cyclical basis throughout the lifecycle of the contract 30.

Also, the processor 20 may renew, terminate, expire, or extend the contract 30 (block 72). To make this determination, the processor 20 may analyze the initial value expected and compare to the actual value realized from the contract 30. The processor 20 may perform a calculation that results in a positive or negative value indicative of whether the contract 30 provided value or cost the insurance provider money. This calculation may be performed for each individual contract 30 and/or may be performed for the portfolio 32 of contracts 30. If the value is positive, the processor 20 may recommend renewing or extending the contract 30. If the value is negative, the processor 20 may attempt to determine the reason for the contract resulting in a negative value. For example, the processor 20 may analyze the initial assumptions provided in the viability step and compare them to the initial assumption of other similar contracts that resulted in a positive number. Such an analysis may enable ascertaining the cause of the negative value. Further, if the value is negative, the processor 20 may recommend terminating the contract 30 or letting the contract 30 expire. In some embodiments, the processor 20 may automatically renew the contract 30, terminate the contract 30, flag the contract 30 for expiration, or extend the contract 30. In some embodiments, the processor 20 may instruct the communication component 24 to communicate an indication of the status of the contract 30 (e.g., the contract 30 has been renewed, terminated, or modified, for example) to the supplier computing device 31 in response to determination of the status of the contract 30. In some embodiments, the processor 20 may generate a contract termination agreement or other document appropriate for the determined status, and the processor 20 may then instruct the communication component 24 to communicate the document to the supplier computing device 31. It should be understood that documents or information provided to the supplier computing device 31 may cause or trigger an alert and/or cause or trigger an application to open on the supplier computing device 31, as discussed above.

Figure 4:
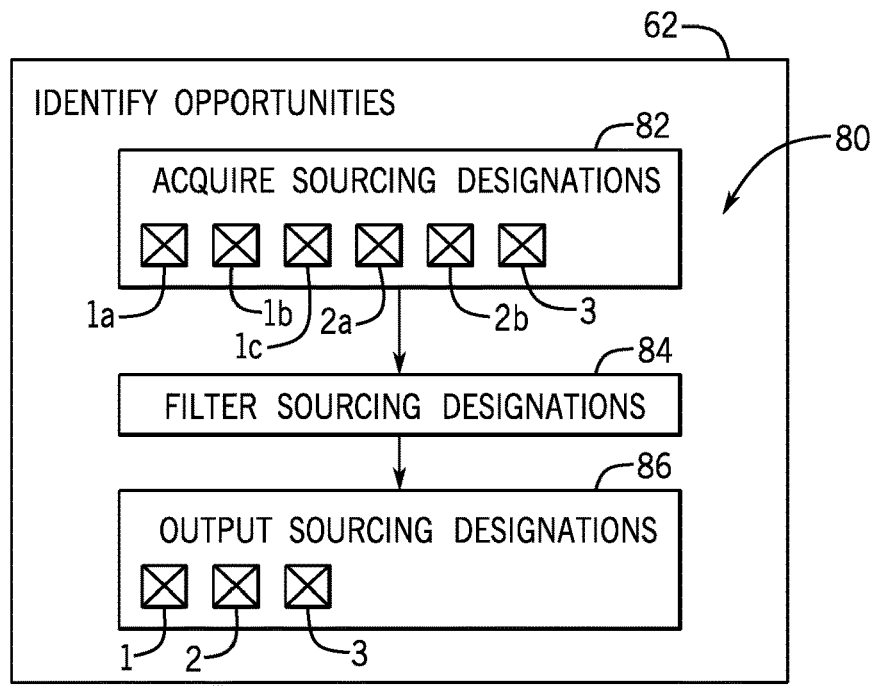
FIG. 4 is a flow chart of a method for identifying opportunities from various sourcing designations, in accordance with embodiments described herein.

FIG. 4 is a flow chart of a method 80 for identifying opportunities from various sourcing designations 28, in accordance with embodiments described herein. As depicted, the method 80 may be included in the block 62 of the method 60 in FIG. 3. Referring now to the method 80 in FIG. 4, the processor 20 may acquire the sourcing designations 28 (block 82), filter the sourcing designations 28 (block 84), and output the filtered sourcing designations 28 (block 86). As previously discussed, the sourcing designations 28 may be entered by a user using an input peripheral of the computing device 14 or a remote device 29, and/or the sourcing designations 28 may be retrieved from the memory 22 or the one or more databases 18. The processor 20 may use one or more matching techniques or regular expressions to identify sourcing designations 28 that include similar words, phrases, symbols, numbers, or the like to filter the sourcing designations 28 by identifying and bringing together like kind sourcing designations 28. Filtering the sourcing ideas by removing duplicate sourcing designations 28 and reducing the number of sourcing designations 28 may allow for efficiency and economies of scale both in the procurement process and in the contracts 30 that are generated. To illustrate, ideas 1a, 1b, 1c, 2a, 2b, and 3 may be acquired in block 82. After the processor 20 filters the sourcing designations 28, designations 1, 2, and 3 may be output for viability determination.

Figure 5:
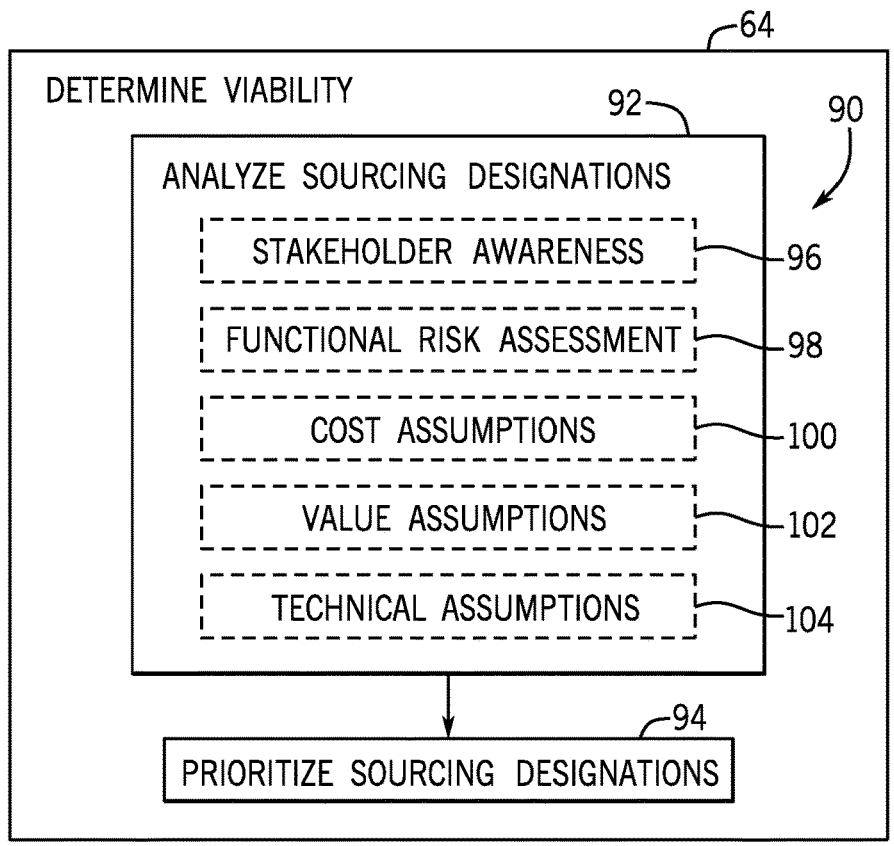
FIG. 5 is a flow chart of a method for determining viability of identified sourcing designations, in accordance with embodiments described herein.

FIG. 5 is a flow chart of a method 90 for determining viability of identified sourcing designations 28, in accordance with embodiments described herein. As depicted, the method 90 may be included in the block 64 of the method 60 of FIG. 3. It should be noted that viability may refer to whether the sourcing designation 28 provides more financial value than the expense and/or effort to carry out the sourcing designations 28. Referring now to the method 90 in FIG. 5, the processor 20 may analyze (block 92) the sourcing designations 28 identified as opportunities and prioritize (block 94) the sourcing designations 28. During viability analysis in block 92, the processor 20 may process each sourcing designation 28 by collecting data elements for a standard set of criteria, such as stakeholder awareness 96, functional risk assessment 98, cost assumptions 100, value assumptions 102, and technical assumptions 104. The data elements may be used to document the expected outcome and benefit to be derived from the sourcing designation 28. The data elements may be stored in the memory 22 or the one or more databases 18.

The stakeholder awareness 96 data element may relate to the degree to which stakeholders (e.g., interested parties) are aware of the problem to be solved by the sourcing designation 28. The functional risk assessment 98 data element may relate to a brand impact, reputation impact, member impact, employee impact, operational impact, regulatory compliance, or strategic elements associated with the sourcing designation 28. The cost assumptions 100 data element may relate to how much money and/or effort will it take to get the contract related to the sourcing designation 28 executed or how much money and/or effort will it cost to manage the contract through the lifecycle (e.g., more complex contracts will have more oversight and be more costly than simpler contracts). Various elements may be accounted for in the cost assumptions, such as any licensing costs, compliance requirements, and the like. The value assumptions 102 data element may relate to the business outcomes (e.g., expected value to be realized) from carrying out a contract representing the sourcing designation 28. The technical assumptions 104 data element may relate to assumptions about technical details of carrying out a contract representing the sourcing designation 28.

Determining the viability of the sourcing designations 28 provides a control mechanism to ensure resources are used on the sourcing designation 28 with the most value. Obtaining the data elements during the viability determination also creates a baseline for those sourcing designations 28 to be evaluated against as the sourcing designations 28 move throughout the rest of the process. If deviations occur later in the process, those deviations may be traced back to determine the root cause for various issues, such as a contract 30 not producing an expected value, among other things. Further, as additional data elements are collected for additional sourcing designations 28, portfolio level assessment is enabled to identify and correct opportunities to realize more value from contracts. Further, the collected data may enable the processor 20 to make predictions of the value that may be realized using certain data elements based on historical correlations (e.g., historical trend analysis).

Further, the processor 20 may determine which sourcing designations 28 are viable and which ones are not viable during the analysis step (block 92). In some embodiments, the processor 20 may weigh the various data elements to determine viability. For example, the processor 20 may determine a sourcing designation 28 is viable, that is expected to provide more value than it costs to implement, and that carries a moderately low level of risk to implement. In contrast, the processor 20 may determine a sourcing designation 28 is not viable if the sourcing designation 28 is expected to cost more to implement than the amount of value to be realized.

After a list of viable sourcing designations 28 are determined, the processor 20 may prioritize (block 94) the ideas. Prioritizing the sourcing designations 28 may include ranking the sourcing designations 28 in order from designations that are expected to produce the most value to the designations that are expected to produce the least value. Additionally, prioritizing the sourcing designations 28 may include analyzing the value that is expected to be produced versus the cost and the risk that is associated with the sourcing designation 28. In some embodiments, those three factors (value, cost, and risk) may be included in an equation to output a score for each of the sourcing designations 28. The factors may be weighted, and, in some instances, the value factor may be weighted more heavily than the cost and risk factors. The sourcing designations 28 may be ranked in the order from the highest resulting score to the lowest resulting score. Prioritizing the viable sourcing designations 28 may enable the insurance provider to allocate resources (e.g., funds, personnel) to the sourcing designations 28 in an effective manner. For example, the insurance provider may generate, negotiate, execute, and/or manage respective contracts for the sourcing designations 28 based on the priority (e.g., contracts for higher priority sourcing designations 28 are generated, negotiated, and/or executed prior to contracts for lower priority sourcing designations 28). Once the sourcing designations 28 are prioritized, the processor 20 may move to a procurement step.

Figure 6:
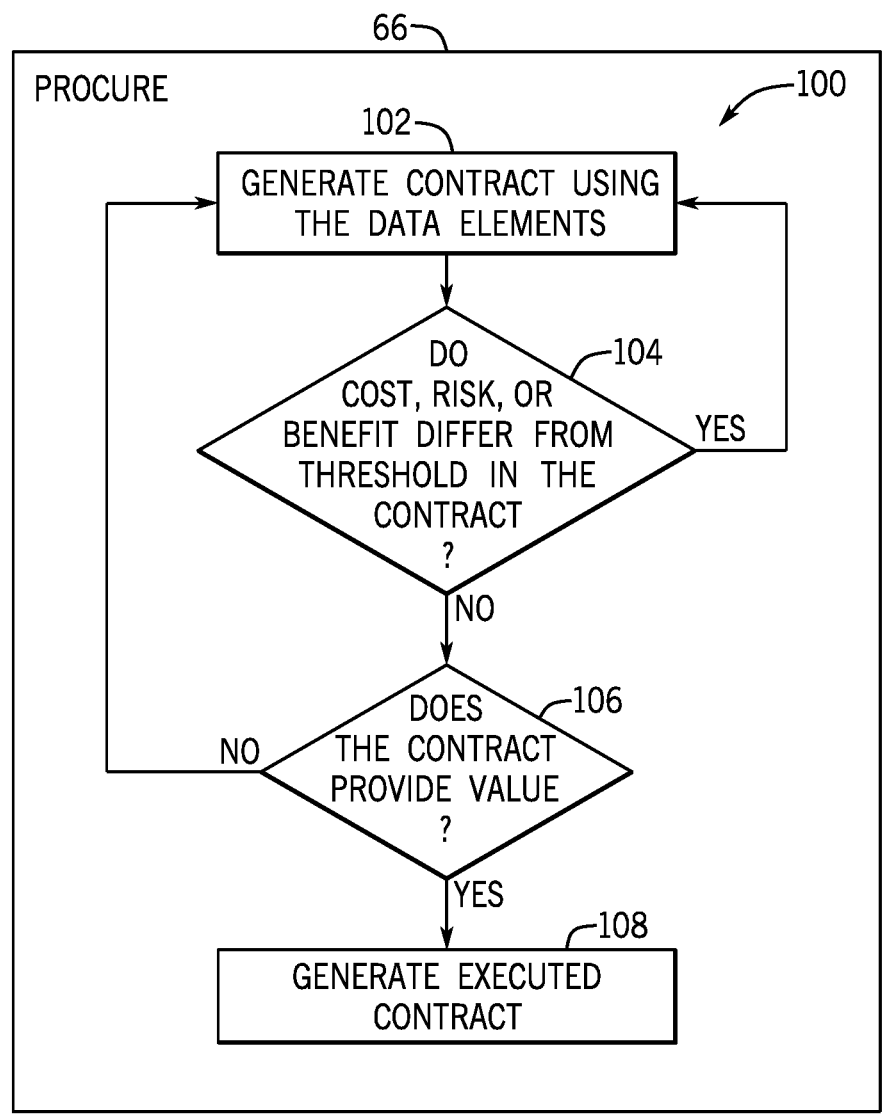
FIG. 6 is a flow chart of a method for procuring an executed external supplier contract, in accordance with embodiments described herein.

As such, FIG. 6 is a flow chart of a method 100 for procuring an executed external supplier contract 30, in accordance with embodiments described herein. As depicted, the method 100 may be included in the block 66 of the method 60 in FIG. 3. Referring now to the method 100 of FIG. 6, the processor 20 may generate (block 102) a contract 30 using the identified data elements obtained during viability determination. Leveraging the data elements collected during viability determination may enable better determination of terms and elements to include within the contract 30. For example, cost assumptions may be memorialized in the contract 30 by specifying the expected cost of services and/or parts. Further, risk may be mitigated by including terms to limit the impact on brand, reputation, or the like (e.g., the supplier may not use the brand of the insurance provider). Additionally, the data elements may be leveraged to determine delivery dates to include in the contract 30 and any dependencies may be specified.

In some embodiments, the processor 20 may use big data techniques to identify trends and correlations between the data elements that are collected to predict the outcome of certain contracts 30 and to include desirable terms and/or elements in the contracts 30 accordingly. For example, the processor 20 may determine that certain data elements cause an effect of full value realization, certain data elements cause an effect of value deterioration, and/or certain data elements mitigate risk. As such, the processor 20 may include the data elements in the contracts 30 that are desirable based on the identified trends and correlations.

During procurement of the contract 30, negotiations often occur that change the elements in a contract. The initial assumptions that may be included in the contract 30 may transform throughout the negotiation process and the terms that are agreed upon may be stored in the memory 22 and/or the database 18. The processor 20 may identify a trend of transformations of certain assumptions during negotiations and may save time in future negotiations by including the agreed upon terms in a subsequent contract for a similar sourcing designation 28 instead of the initial assumption. When initial assumptions are modified, a trigger may cause the processor 20 to recalculate the value and/or risk of the contracts 30. The trigger may be a mechanism to catch changed assumptions early in the process to manage the relationship with the external supplier.

Further, the processor 20 may use one or more thresholds against which to compare terms and elements of the contract 30. The thresholds may be used to ensure that the certain terms and/or elements in the contract 30 do not increase cost and/or risk or reduce benefit to the point where the contract 30 no longer provides value. The processor 20 may determine (block 104) whether the cost, risk, or benefit differ from respective thresholds. Thus, the processor 20 may perform calculations that quantify the cost, risk, and benefit of the service represented by the contract 30. If the cost, risk, or benefits differ from respective thresholds, then the processor 20 may return to generating another contract using the data elements or the processor 20 may modify the existing contract 30 to return terms and elements within the thresholds. If the cost, risk, or benefit does not differ from the respective thresholds, then the processor 20 may determine (block 106) whether the contract 30 provides value. If the contract 30 no longer provides value, then the processor 20 may return to generating another contract 30 using the data elements or negotiations may be terminated. If the contract 30 provides value, then the processor 20 may generate (block 108) an executed (signed) external supplier contract 30. Data related to the expected value of the finalized executed external supplier contract 30 may be obtained by the processor 20 and stored in the memory 22 and/or the databases 18. Further, the executed external supplier contract 30 may be stored in the memory 22 and/or the databases 18. It should be noted that the processor 20 may compare the value, cost, and/or risk of contracts 30 that are currently being executed against the thresholds to determine whether a change in a process during the contract has caused the value, cost, and/or risk to differ from the thresholds.

Figure 7:
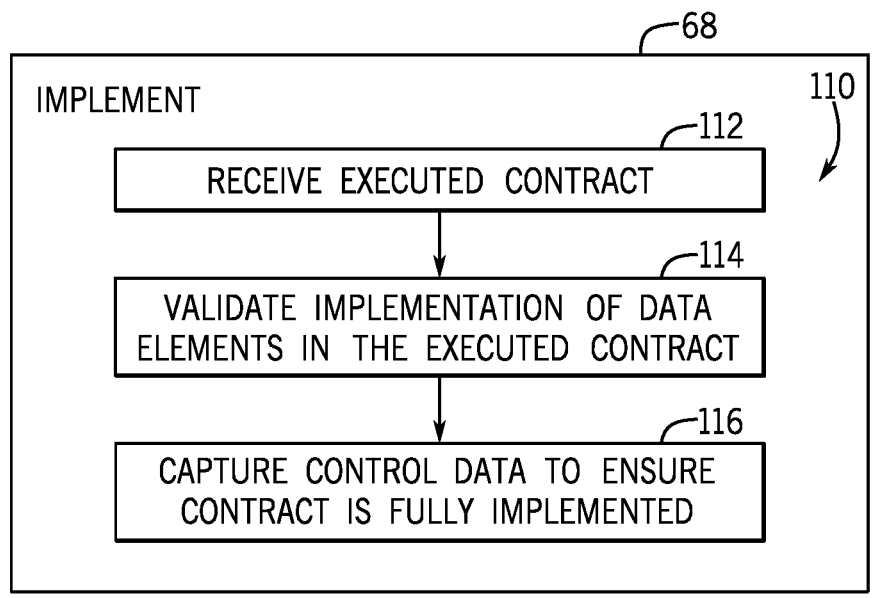
FIG. 7 is a flow chart of a method for implementing objectives in an executed contract, in accordance with embodiments described herein.

FIG. 7 is a flow chart of a method 110 for implementing data elements in an executed contract 30, in accordance with embodiments described herein. As depicted, the method 110 may be included in the block 68 of the method 60 in FIG. 3. Referring now to the method 110 in FIG. 7, the processor 20 may receive (block 112) the executed contract 30 (e.g., from the memory 22 or the databases 18) or the processor 20 may already possess the executed contract 30 from the procurement step. The processor 20 may validate (block 114) implementation of the data elements obtained during viability determination in the executed contract 30. Validating implementation may mitigate value leakage when the contract 30 is executed. This step may include determining that language is included in the contract 30 so the sourcing designation 28 is enabled to provide full value. For example, the processor 20 may search for language related to specifying knowledge transfer occurring, system linkages, providing change management, or the like. In other words, the processor 20 may retrieve the data elements (e.g., initial assumptions) obtained during viability determination or procurement and ensure that the data elements are fully implemented in the contract 30 by using string comparison techniques, regular expressions, or the like. Further, the processor 20 may capture (block 116) control data to ensure the contract 30 is fully implemented. The control data may be assessed as part of contract validation and root cause analysis if opportunities (e.g., value realization, risk mitigation, cost reduction) are identified. If the processor 20 determines that the contract 30 does not fully implement one or more data elements, then the processor 20 may return to the procurement step and/or discard the executed contract 30. If the processor 20 determines that the contract 30 fully implements the desired data elements, then the processor 20 may move into a managing step.

Figure 8:
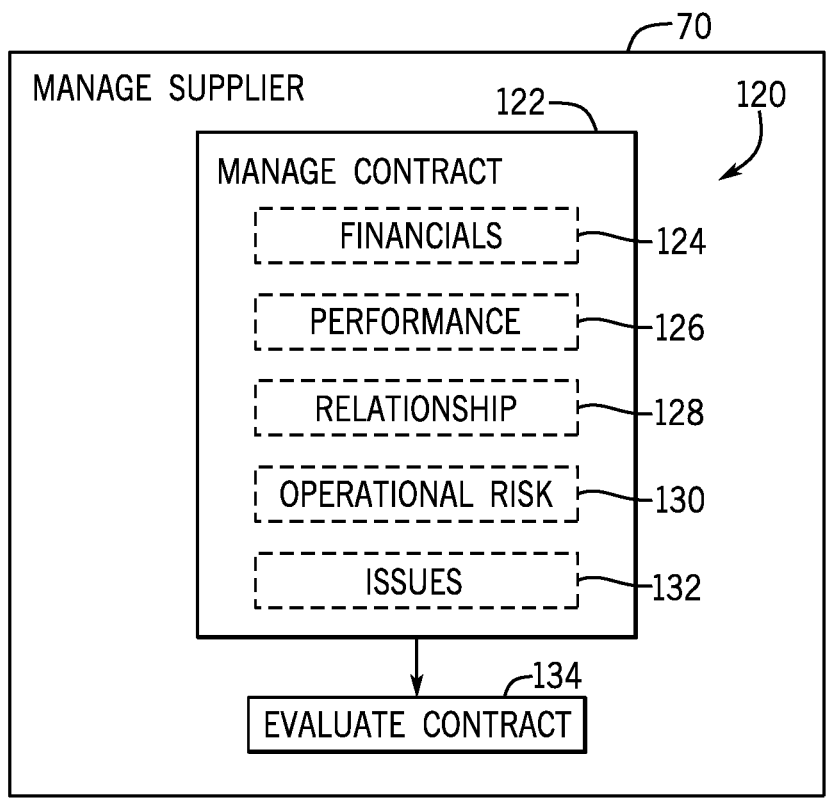
FIG. 8 is a flow chart of a method for managing the external supplier contracts in a supplier portfolio, in accordance with embodiments described herein.

Accordingly, FIG. 8 is a flow chart of a method 120 for managing the external supplier contracts 30 in a supplier portfolio 32, in accordance with embodiments described herein. As depicted, the method 120 may provide comprehensive management of the external supplier contract 30 including the data capture of various management elements. Rules (e.g., algorithms or thresholds) may be used to trigger (e.g., automatically trigger or cause) additional actions or escalate actions for specific management elements. The method 120 may be included in the block 68 of the method 60 in FIG. 3.

Referring now to the method 120 in FIG. 8, the processor 20 may manage (block 122) the executed contracts 30. The processor 20 may manage various elements of the contracts 30, such as the financials 124, the performance 126 of the external suppliers, the relationship 128 with the external suppliers, the operational risk 130 of the service provided by the suppliers, and/or the issues 132 arising from the contracts 30. The management elements 124, 126, 128, 130, and 132 enable comparing the actual performance of the contract 30 versus the elements defined and captured in the contract 30 during the viability, procurement, and/or implementation steps described above. In certain embodiments, data indicative of the management elements 124, 126, 128, 130, and 132 may be received at the processor 20 via a user input at an input peripheral of the computing devices 14, 31 and/or the remote device 29, for example.

More specifically, the financials 124 management element relates to the amount of money being spent by the supplier. The processor 20 may compare the amount of money being spent by the supplier to the expected cost that was agreed upon in the contract 30 or defined in the cost assumptions data element in the viability determination. If the amount of money being spent exceeds the expected cost, then the full value of the contract 30 may be diminished. The performance 126 management element may relate to how well the supplier is fulfilling the contract 30 (e.g., deliverables and obligations), how well the supplier is delivering the actual product or service, or the like. The relationship 128 management element may relate to how well the supplier is supporting the insurance provider, innovating with the insurance provider, understanding the needs of the insurance provider, or the like. Data related to the relationship 128 management element may be obtained via a user taking a survey at an enterprise level. The operational risk 130 management element may relate to the various risk data elements discussed above, such as brand impact, reputation impact, member impact, employee impact, operational impact, and the like. The issues 132 management element may relate to how the supplier deals with issues that arise during contract 30 execution, such as obstacles (e.g., product shortages, employee shortages) and/or delays. By capturing data related to the management elements, the processor 20 may evaluate the management elements and associated variation from expected metrics. The processor 20 may use rules to identify when a contract should be evaluated (block 134) or terminated based on the variations.

For example, the rules may include a rule that triggers reevaluation of the contract 30 by the processor 20 when the cost or operational risk increases above a threshold. Further, another rule may trigger termination of the contract 30 by the processor 20 when the cost exceeds a threshold by a certain amount. Another rule may trigger reevaluation of the contract 30 by the processor 20 when the supplier misses a deadline provided in the contract 30. It should be appreciated that any suitable rules may trigger any appropriate action (e.g., reevaluation, termination, modification, audible and/or visual alerts via the computing device 14, the remote device 29, and/or the supplier computing device 31) based on variations (e.g., in cost, risk, time delays, or the like during fulfillment of the contract 30) determined by the processor 20. Management of the contract 30 may be performed on a cyclic basis (e.g., weekly, monthly, yearly) throughout the lifecycle of the contract 30.

Figure 9:
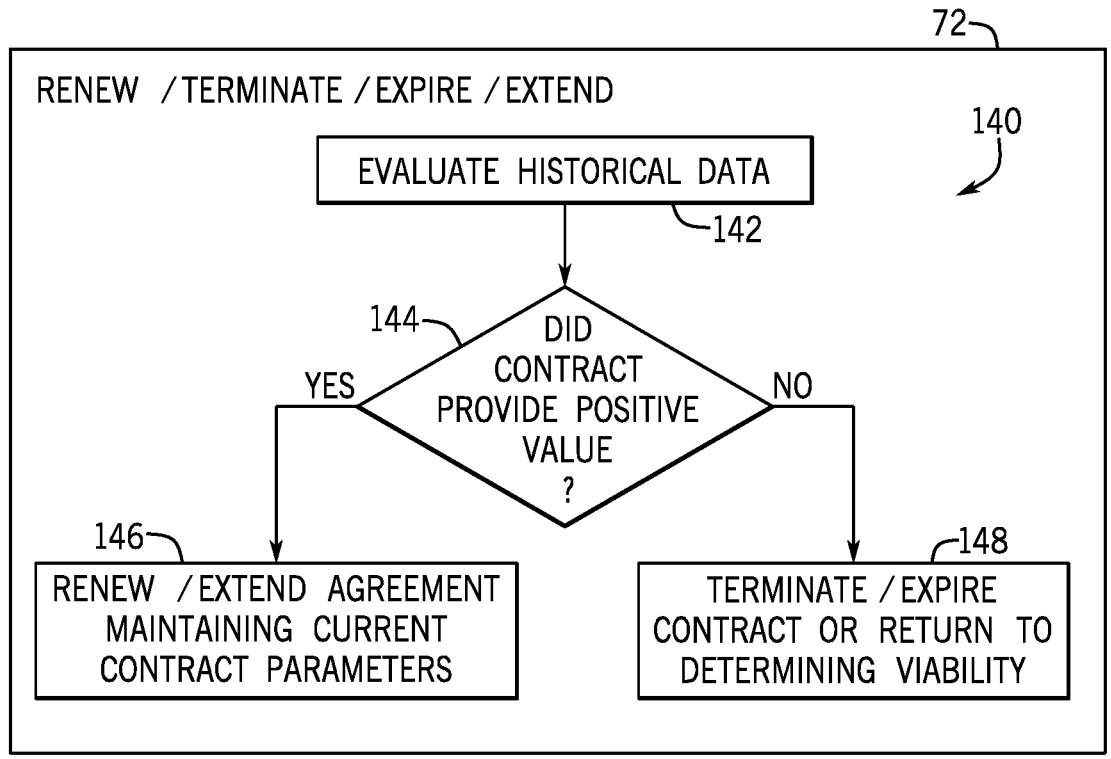
FIG. 9 is a flow chart of a method for renewing, terminating, flagging for expiration, or extending one or more supplier contracts, in accordance with embodiments described herein.

FIG. 9 is a flow chart of a method 140 for renewing, terminating, expiring, or extending one or more supplier contracts 30, in accordance with embodiments described herein. As depicted, the method 140 may be included in the block 72 of the method 60 in FIG. 3. Referring now to the method 140 in FIG. 9, the processor 20 may evaluate (block 142) historical data stored in the memory 22 and/or the databases 18. The processor 20 leverages the data accumulated from determining the viability of the sourcing designations 28 through procurement of the contracts 30, implementation of the contracts 30, and management of the contracts 30 to systematically evaluate the contracts 30 in the portfolio 32. The evaluation performed in this step may include the original contract terms and elements and historical data terms and elements for similar contracts 30. Based on the evaluation, a rule may recommend the proper course of action. For example, the processor 20 may determine (block 144) whether the contract 30 provided positive value (e.g., non-negative value). If the contract 30 provided positive value, then a rule may cause the processor 20 to renew/extend (block 146) the contract 30 maintaining the current contract terms and/or elements. If the contract 30 did not provide a positive value, then the processor 20 may terminate the contract 30, flag the contract 30 for expiration, or return to determining the viability of the sourcing designation 28 (block 148).

As may be appreciated, a benefit of the disclosed techniques may include enabling the processor 20 to analyze data collected before contract execution, during contract execution, and after contract execution to provide a holistic view of the property and casualty source and manage supplier process. For example, when the processor 20 reaches block 72 to determine whether to renew, terminate, flag for expiration, or extend the contract 30, the processor 20 may identify which contracts 30 in the portfolio 32 met or exceeded expectations from initial assumptions or terms/elements in the executed contracts 30. The processor 20 may determine to renew or extend those contracts 30. Also, the processor 20 may identify which contracts 30 in the portfolio 32 have opportunity for growth (e.g., relationship with the supplier consumed a lot of time and money to maintain, the contract did not provide full value), and the processor 20 may determine to renegotiate the contract 30, terminate the contract 30, or flag the contract 30 for expiration. At a portfolio view, the historical data that is collected throughout the process may be leveraged in future sourcing engagements to better predict what opportunities may be triggered and what terms/elements in the contracts 30 led to full realization of value by identifying trends. For example, trends of contracts 30 that successfully realized full value may be identified and terms/elements used in identified contracts 30 may be reused in subsequent contracts 30 for similar sourcing designations 28 to better realize value and/or perform actions in the future.

Figure 10:
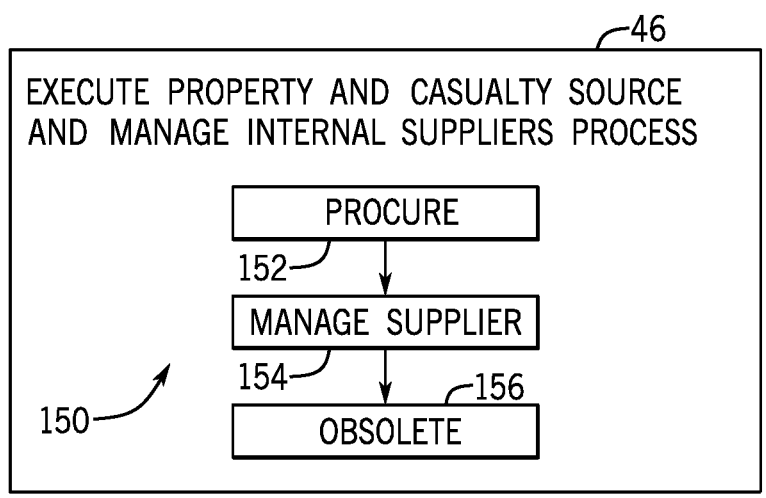
FIG. 10 is a flow chart of a method for executing a property and casualty source and manage internal supplier process, in accordance with embodiments described herein.

Turning now to the internal suppliers, FIG. 10 is a flow chart of a method 150 for executing a property and casualty source and manage internal supplier process, in accordance with embodiments described herein. The method 150 may be included as part of the block 46 of the method 40 in FIG. 2. Although the method 150 for sourcing and managing internal suppliers is depicted as just including three steps, it should be understood that, in some embodiments, the method 150 includes the same steps as the method 60 in FIG. 3 for external suppliers. It should be noted that each of the steps of the method 150 may be identified at a high level in the following discussion and described at a detailed level regarding respective flow charts in FIGS. 11-13. Referring now to the method 150, the processor 20 may procure (block 152) a contract 30 with an internal supplier, manage (block 154) the internal supplier contract 30, and determine (block 156) whether the contract 30 is obsolete.

Figure 11:
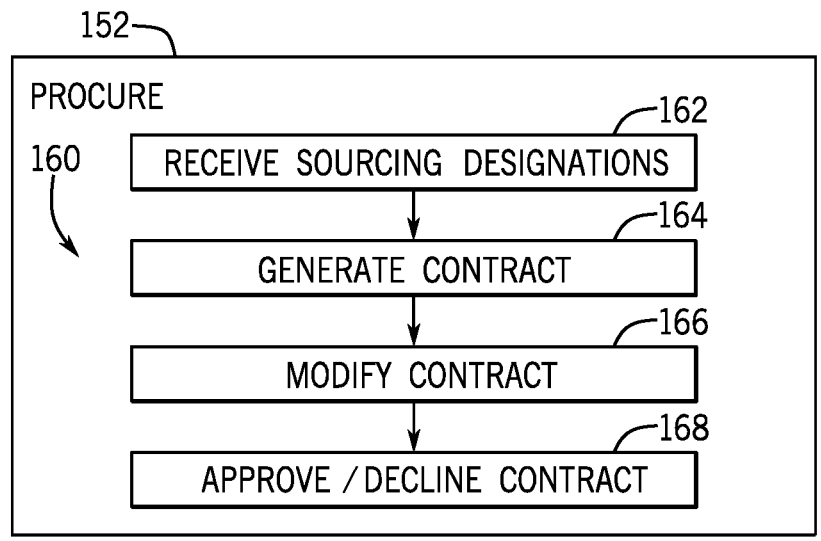
FIG. 11 is a flow chart of a method for procuring an executed internal supplier contract, in accordance with embodiments described herein.

More specifically regarding procurement, FIG. 11 is a flow chart of a method 160 for procuring an executed internal supplier contract, in accordance with embodiments described herein. As depicted, the method 160 may be included in the block 152 of the method 150 in FIG. 10. Referring now to the method 160 in FIG. 11, the processor 20 may receive (block 162) one or more sourcing designations 28, generate (block 164) one or more contracts 30 for the sourcing designations 28, modify (block 166) the contracts 30 based on negotiations, and approve/decline (block 168) the contract 30. The generated contract 30 may include terms and elements for the agreement between the insurance provider and the internal supplier, such as the service or product to be provided by the internal supplier, the cost of the service or product, delivery dates/timeframe for delivery, any system linkages, dependencies, and the like. The processor 20 may determine the expected value to be realized from the contract 30 with the internal supplier 30. Further, the processor 20 may perform a calculation to quantify the risk associated with the contract 30 and the cost of executing the contract 30. The value, cost, and/or risk may be stored in the memory 22 and/or the databases 18. Further, the value, cost, and/or risk may be compared against the value, cost, and/or risk for a contract for the same sourcing designation 28 using external suppliers.

Figure 12:
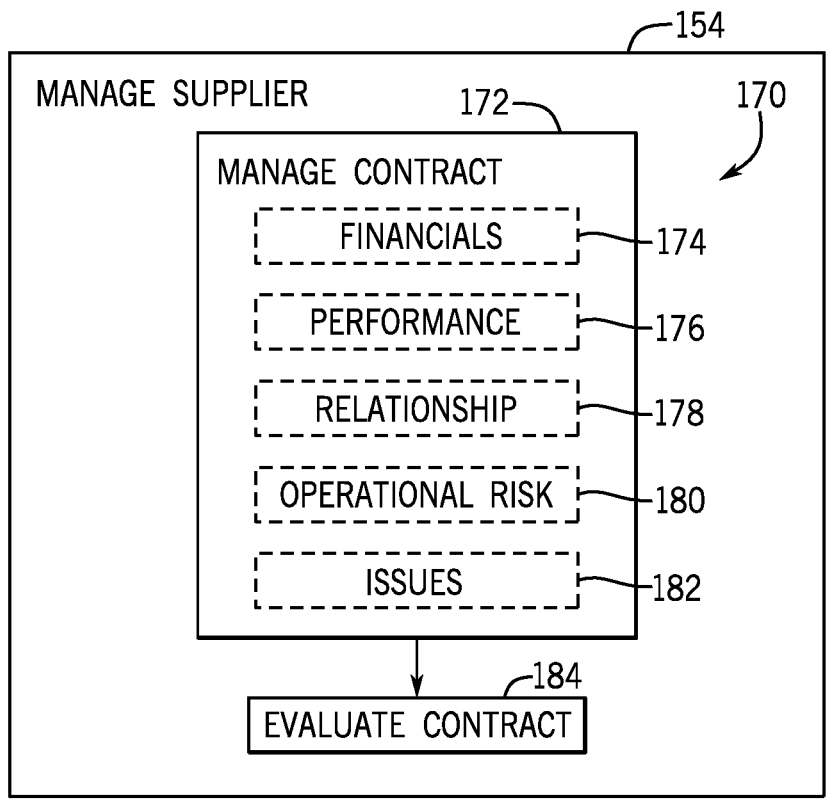
FIG. 12 is a flow chart of a method for managing the internal supplier contracts in a supplier portfolio, in accordance with embodiments described herein.

FIG. 12 is a flow chart of a method 170 for managing the internal supplier contracts in a supplier portfolio, in accordance with embodiments described herein. As depicted, the method 170 may be included in the block 154 of the method 150 in FIG. 10. Referring now to the method 170, the processor 20 may manage (block 172) the contract with the internal supplier by analyzing certain management elements, such as financials 174, performance 176 of the internal supplier, relationship 178 with the internal supplier, operational risk 180 of the contract 30, and/or the issues 182 that arise during execution of the contract 30.

In particular, the financials 174 management element relates to the amount of money being spent by the internal supplier to execute the service or deliver the product described in the contract 30. The processor 20 may compare the amount of money being spent by the internal supplier to the expected cost that was agreed upon in the contract 30. If the amount of money being spent exceeds the expected cost, then the expected value of the contract 30 may be diminished. The performance 176 management element may relate to how well the internal supplier is fulfilling the contract 30 (e.g., deliverables and obligations), how well the internal supplier is delivering the actual product or service, or the like. The relationship 178 management element may relate to how well the internal supplier is supporting the insurance provider, innovating with the insurance provider, understanding the needs of the insurance provider, or the like. Data related to the relationship 178 management element may be obtained via a user taking a survey at an enterprise level. The operational risk 180 management element may relate to the various risk data elements discussed above, such as brand impact, reputation impact, member impact, employee impact, operational impact, and the like. The issues 182 management element may relate to how the internal supplier deals with issues that arise during contract 30 execution, such as obstacles (e.g., product shortages, employee shortages) and/or delays. By capturing data related to the management elements, the processor 20 may evaluate the management elements and associated variation from expected metrics. The processor 20 may use rules to identify when a contract 30 should be evaluated (block 184) or terminated based on the variations.

Figure 13:
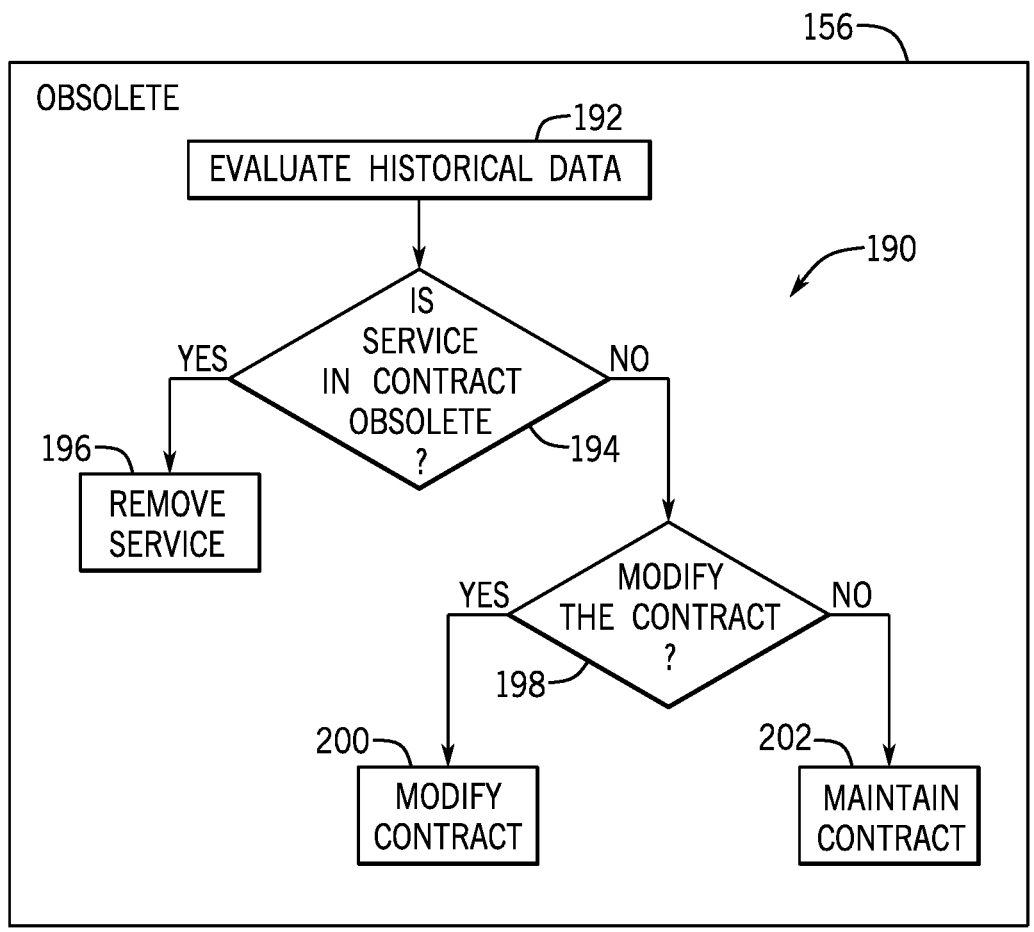
FIG. 13 is a flow chart of a method for determining whether an internal supplier contract is obsolete, in accordance with embodiments described herein.

FIG. 13 is a flow chart of a method 190 for determining whether an internal supplier contract 30 is obsolete, in accordance with embodiments described herein. As depicted, the method 190 may be included in the block 156 of the method 150 in FIG. 10. Referring now to the method 190, the processor 20 may evaluate (block 192) historical data in the memory 22 and/or the databases 18 related to the contract 30 or similar contracts 30. The processor 20 may leverage the data accumulated from procuring the contracts 30 representing the sourcing designations 28 and managing the contracts 30 to systematically evaluate the contracts 30. The evaluation performed in this step may include comparing the original contract terms and elements with historical data terms and elements for similar contracts 30. Based on the evaluation, a rule may recommend the proper course of action.

The processor 20 may determine (block 194) whether the service specified in the contract 30 is obsolete. If the service is obsolete, then the processor may remove (block 196) the service by modifying the contract 30 or may terminate the contract 30. If the service is not obsolete, then the processor 20 may determine (block 198) whether to modify the contract 30. The processor 20 may consider whether trends identified by evaluating historical data related to similar contracts show certain terms and/or elements are missing from the contract 30 that typically result in full realization of value. Also, a trigger that identifies certain terms and/or elements in the contract that are identified as value diminishing based on trends in the historical data for similar contracts may cause the processor 20 to modify the contract 30. If the processor 20 determines to modify the contract 30, then the processor 20 may modify (block 200) the contract 30 by changing one or more terms and/or elements and storing the contract 30 in the memory 22 or the databases 18. If the processor 20 determines to not modify the contract 30, then the processor may maintain (block 202) the contract 30 in its current form.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system comprising:
a processor operatively coupled to a memory, wherein the processor is configured to:
receive an indication of one or more sourcing designations for a property and casualty insurance claim for a property from one or more sensors; and
in response to receipt of the indication of the one or more sourcing designations for the property and casualty insurance claim for the property from the one or more sensors:
evaluate at least one of a respective risk and a respective cost of multiple suppliers that may be used to address the one or more sourcing designations;
provide a recommendation to use a recommended supplier of the multiple suppliers based at least in part on the at least one of the respective risk and the respective cost of the multiple suppliers; and
generate and present a contract for use with the recommended supplier of the multiple suppliers.

2. The system of claim 1, wherein the one or more sensors are configured to detect a water leak at the property.

3. The system of claim 1, wherein the one or more sensors are configured to detect a presence of water, fire, wind, hail, or any combination thereof.

4. The system of claim 1, wherein the processor is configured to instruct a communications device to transmit the contract to a supplier computing device of the recommended supplier in response to generation of the contract.

5. The system of claim 4, wherein the system comprises the supplier computing device, and the supplier computing device is configured to provide an alert in response to receipt of the contract, to open an application to facilitate review of the contract in response to the receipt of the contract, or both.

6. The system of claim 1, wherein the processor is configured to terminate, renew, or modify the contract based on a change in cost, a change in risk, or both during fulfillment of the contract by the recommended supplier.

7. The system of claim 6, wherein the processor is configured to terminate the contract when an actual cost during fulfillment of the contract exceeds a threshold, and in response to termination of the contract, the processor is configured to generate a termination agreement and to instruct a communications device to transmit the termination agreement to a supplier computing device of the recommended supplier.

8. The system of claim 1, wherein the processor is configured to receive and to analyze supplier-requested changes to contractual terms and to generate a subsequent contract for another sourcing designation that includes modified contractual terms based on the supplier-requested changes.

9. The system of claim 1, wherein the processor is configured to recalculate the at least one of the respective risk and the respective cost associated with the recommended supplier in response to receipt of supplier-requested changes to the contract.

10. The system of claim 1, comprising the one or more sensors, wherein the one or more sensors are located at the property and are configured to detect damage to the property.

11. The system of claim 1, wherein the processor is configured to evaluate the respective risk of the multiple suppliers based on historical data related to previous contracts for previous sourcing designations that were fulfilled by the multiple suppliers.

12. One or more tangible, non-transitory computer readable mediums storing instructions configured to cause a processor to:
receive an indication of one or more sourcing designations for one or more property and casualty insurance claims for one or more properties from one or more sensors located at the one or more properties;
in response to receipt of the indication of the one or more sourcing designations for the one or more property and casualty insurance claims for the one or more properties from the one or more sensors:
execute a first process for sourcing and managing a first supplier, wherein the first process uses the one or more sourcing designations as inputs and results in at least a first cost and a first risk level;
execute a second process for sourcing and managing a second supplier, wherein the second process uses the one or more sourcing designations as inputs and results in at least a second cost and a second risk level;
comparing the first cost to the second cost, the first risk level to the second risk level, or both;
recommending to use the first supplier or the second supplier to source the one or more property and casualty claims for the one or more properties based on the comparison; and
generating and displaying on a display a contract based on the recommendation.

13. The non-transitory computer readable medium of claim 12, wherein the first supplier comprises an external supplier accessible via external internet systems and the second supplier comprises an internal supplier accessible via an internal network.

14. The non-transitory computer readable medium of claim 12, wherein recommending to use the first supplier or the second supplier comprises instructing the display to provide an indication of a recommended supplier.

15. The non-transitory computer readable medium of claim 12, wherein the instructions cause the processor to instruct a communications device to transmit the contract to a supplier computing device in response to generation of the contract.

16. The non-transitory computer readable medium of claim 12, wherein the instructions cause the processor to determine and to include contractual terms in the contract, wherein the contractual terms include an expected cost, a delivery date, or both.

17. The non-transitory computer readable medium of claim 12, wherein the instructions cause the processor to terminate, renew, or modify the contract based on a change in cost, a change in risk, or both during fulfillment of the contract.

18. A method, comprising:
  receiving, at a processor, an indication of a plurality of sourcing designations for a plurality of property and casualty insurance claims for a plurality of properties from a plurality of sensors located at the plurality of properties;
  in response to receiving the indication of the plurality of sourcing designations from the plurality of sensors located at the plurality of properties, initiating steps comprising:
    determining, using the processor, at least one of a first cost and a first risk level associated with using a first supplier to address the plurality of sourcing designations;
    determining, using the processor, at least one of a second cost and a second risk level associated with using a second supplier to address the plurality of sourcing designations;
    comparing, using the processor, the first cost to the second cost, the first risk level to the second risk level, or both;
    providing, using the processor, a recommendation to use the first supplier or the second supplier to source the plurality of property and casualty claims based on the comparison;
    generating, using the processor, a contract based on the recommendation; and
    instructing, using the processor, a communications device to transmit the contract to a supplier computing device in response to generation of the contract.

19. The method of claim 18, wherein the first supplier comprises an external supplier and the second supplier comprises an internal supplier.

20. The method of claim 18, comprising:
  receiving, at the processor, at least one additional indication of at least one additional sourcing designation; and
  in response to receiving the indication of the plurality of sourcing designations from the plurality of sensors located at the plurality of properties and the at least one additional indication of the at least one additional sourcing designation:
    filtering, using the processor, the at least one additional sourcing designation and the plurality of sourcing designations to identify and to bring together the plurality of sourcing designations as like kind sourcing designations prior to determining the at least one of the first cost and the first risk level associated with using the first supplier to address the plurality of sourcing designations and prior to determining at least one of the second cost and the second risk level associated with using the second supplier to address the plurality of sourcing designations.

\* \* \* \* \*